(12) United States Patent
Romero et al.

(10) Patent No.: US 7,548,004 B1
(45) Date of Patent: Jun. 16, 2009

(54) PASSIVE LEVITATION IN ALTERNATING MAGNETIC FIELDS

(75) Inventors: Louis Romero, Albuquerque, NM (US); Todd Christenson, Albuquerque, NM (US); Eugene A. Aronson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 525 days.

(21) Appl. No.: 11/231,533

(22) Filed: Sep. 21, 2005

Related U.S. Application Data

(60) Provisional application No. 60/612,606, filed on Sep. 22, 2004.

(51) Int. Cl.
*H02K 7/09* (2006.01)
(52) U.S. Cl. .................................... 310/90.5; 310/68 R
(58) Field of Classification Search ................ 310/90.5, 310/68 R, 68 B
See application file for complete search history.

(56) References Cited

U.S. PATENT DOCUMENTS 5,404,062 A  4/1995 Hones et al.
6,215,218 B1 * 4/2001 Ueyama .................... 310/90.5
6,472,787 B1 * 10/2002 Kameno et al. ............ 310/90.5

OTHER PUBLICATIONS

Romero, L.A., "Passive levitation in Alternating Magnetic fields" SIAM Journal on Applied Mathematics, 2002, vol. 63, No. 6, p. 2155-75.*
G. Genta, et al, Gyroscopic Stabilization of Passive Magnetic Levitation, Meccanica, 34, 1999, pp. 411-424, Jan. 2000.
W. Paul, Electromagnetic Traps for Charged and Neutral Particles, Reviews of Modern Phys., vol. 62, No. 3, 1990, pp. 531-540, Jul. 1990.
J. Howard and R. MacKay, Linear Stability of Symplectic Maps, J. Math. Phys., 28 (5), 1987, pp. 1036-1051, May 1987.

* cited by examiner

*Primary Examiner*—Quyen Leung
*Assistant Examiner*—David W. Scheuermann
(74) *Attorney, Agent, or Firm*—Madelynne J. Farber

(57) ABSTRACT

Stable levitation of an object in an alternating magnetic field can be achieved by eliminating coupling between the rotational and translational forces acting on the object. Stable levitation can also be achieved by varying the coupling between the rotational and translational forces acting on the object, while maintaining one or more of the rotational and translational forces steady in time.

16 Claims, 15 Drawing Sheets

$$\begin{cases} (a) & m\ddot{x} - A(t)x - B(t)\phi = 0, \\ (b) & m\ddot{y} - A(t)y - B(t)\theta = 0, \\ (c) & m\ddot{z} + 2A(t)z = 0, \\ (d) & I_1\ddot{\theta} - C(t)\theta + B(t)y = 0, \\ (e) & I_1\ddot{\phi} - C(t)\phi + B(t)x = 0. \end{cases}$$

FIG. 1

$$\begin{cases} (a) & A(t) = -\frac{1}{2}\frac{\partial F_z}{\partial z} = \frac{\partial F_x}{\partial x} = \frac{\partial F_y}{\partial y}, \\ (b) & B(t) = -\frac{1}{2}\frac{\partial \tau_x}{\partial y} = \frac{\partial \tau_y}{\partial x} = \frac{\partial F_x}{\partial \phi} = -\frac{\partial F_y}{\partial \theta}, \\ (c) & C = \frac{\partial \tau_x}{\partial \theta} = \frac{\partial \tau_y}{\partial \phi}. \end{cases}$$

FIG. 2

$$\begin{cases} (a) & A(t) = A_0 + A_v \cos(wt), \\ (b) & B(t) = B_0 + B_v \cos(wt), \\ (c) & C(t) = C_0 + C_v \cos(wt). \end{cases}$$

FIG. 3

$$\begin{cases} (a) & x = \xi\sqrt{I_1/m}, \\ (b) & y = \chi\sqrt{I_1/m}, \\ (c) & z = \eta\sqrt{I_1/m}, \\ (d) & t = s/w. \end{cases}$$

FIG. 4

$$\begin{cases} (a) & \ddot{\xi} - (\alpha_0 + \alpha_v \cos(s))\xi + (\beta_0 + \beta_v \cos(s))\phi = 0, \\ (b) & \ddot{\phi} + (\gamma_0 + \gamma_v \cos(s))\xi + (\beta_0 + \beta_v \cos(s))\xi = 0, \\ (c) & \ddot{\eta} + 2(\alpha_0 + \alpha_v \cos(s))\eta = 0. \end{cases}$$

FIG. 5

$$\begin{cases} (a) & \alpha_0 = \dfrac{A_0}{mw^2}, \\ (b) & \gamma_0 = \dfrac{-C_0}{I_1 w^2}, \\ (c) & \beta_0 = \dfrac{B_0}{\sqrt{mI_1}\,w^2}, \\ (d) & \alpha_v = \dfrac{A_v}{mw^2}, \\ (e) & \gamma_v = \dfrac{-C_v}{I_1 w^2}, \\ (f) & \beta_v = \dfrac{B_v}{\sqrt{mI_1}\,w^2}. \end{cases}$$

FIG. 6

FIG. 7(a) $\underline{q} = R(t) \begin{pmatrix} \xi \\ \dot{\xi} \\ \phi \\ \dot{\phi} \end{pmatrix}$ — 71

FIG. 7(d) $\Gamma = Q(2\pi)$ — 74

FIG. 7(f) $\dfrac{dWr}{dt} = tr(R(t))Wr$ — 76

FIG. 7(e) $\begin{pmatrix} \xi \\ \dot{\xi} \\ \phi \\ \dot{\phi} \end{pmatrix} = 0$ — 75

$$\begin{cases} (a) & Z_1(\Gamma) = 8 + 2tr(\Gamma^2) - tr(\Gamma)^2 > 0, \\ (b) & Z_2(\Gamma) = (2 - tr(\Gamma))^2 - tr(\Gamma^2) > 0, \\ (c) & Z_3(\Gamma) = (2 + tr(\Gamma))^2 - tr(\Gamma^2) > 0, \\ (d) & Z_4(\Gamma) = 4 - tr(\Gamma) > 0, \\ (e) & Z_5(\Gamma) = tr(\Gamma) + 4 > 0. \end{cases}$$

FIG. 8

$$\begin{cases} (a) & \ddot{\xi} - (\alpha_0 + \alpha_v \cos(s))\xi = 0 \\ (b) & \ddot{\eta} + 2(\alpha_0 + \alpha_v \cos(s))\eta = 0 \end{cases}$$

FIG. 9

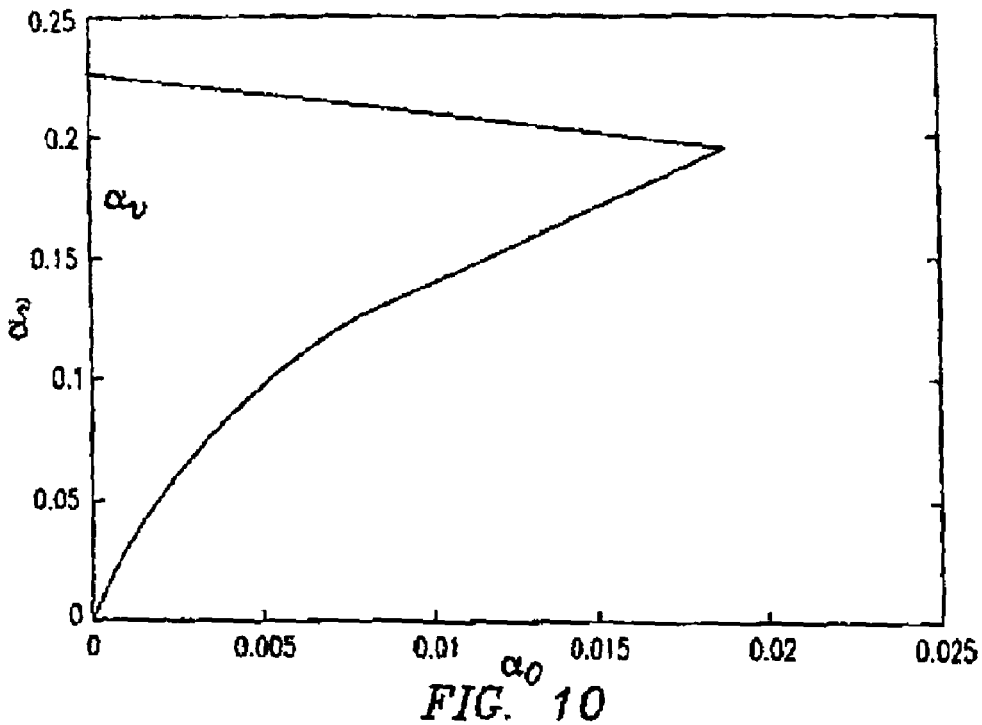

FIG. 10

$$\begin{cases} (a) & \ddot{\xi} - \alpha_0 + \beta_v \cos(s)\phi = 0 \quad \text{---111} \\ (b) & \ddot{\phi} + \gamma_0 \phi + \beta_v \cos(s)\xi = 0 \quad \text{---110} \end{cases}$$

FIG. 11

$$\begin{cases} (a) & \phi(s) = \dfrac{\xi(s)\beta_v \cos(s)}{1-\gamma_0} \quad \text{---120} \\ (b) & \ddot{\xi} - \alpha_0 \xi + \xi\dfrac{\beta_v^2}{1-\gamma_0}\cos^2(s) = 0. \quad \text{---121} \\ (c) & \ddot{\xi} + \left(\dfrac{\beta_v^2}{2(1-\gamma_0)} - \alpha_0\right)\xi + \dfrac{\beta_v^2}{2(1-\gamma_0)}\cos(2s)\xi = 0. \quad \text{---122} \end{cases}$$

FIG. 12

$$\beta_v^2 = 2\alpha_0 (1-\gamma_0) \quad 2(\frac{\beta_v^2}{1-\gamma_0}) - \alpha_0 > 0.$$

$$2(\frac{\beta_v^2}{1-\gamma_0}) + \gamma_0 > 0.$$

$$\begin{cases} (a) & \xi(s) = \xi_0(s) + \xi_1(s), \\ (b) & \phi(s) = \phi_0(s) + \phi_1(s), \end{cases}$$

FIG. 27

$$\begin{cases} (a) & \ddot{\xi} - \alpha_v \cos(s)\xi_0 + \beta_v \cos(s)\phi_0 = 0, \\ (b) & \ddot{\phi} - \gamma_v \cos(s)\phi_0 + \beta_v \cos(s)\xi_0 = 0. \end{cases}$$

FIG. 28

$$\begin{cases} (a) & \xi_1 = \cos(s)(-\alpha_v \xi_0 + \beta_v \phi_0), \\ (b) & \phi_1 = \cos(s)(-\gamma_v \phi_0 + \beta_v \xi_0). \end{cases}$$

FIG. 29

$$\begin{cases} (a) & \ddot{\xi} - \alpha_{eff}\xi_0 + \beta_{eff}\phi_0 = 0, \\ (b) & \ddot{\phi} - \gamma_{eff}\xi_0 + \beta_{eff}\xi_0 = 0, \\ (c) & \alpha_{eff} = \alpha - \frac{1}{2}\alpha_v^2 - \frac{1}{2}\beta_v^2, \\ (d) & \beta_{eff} = \beta - \frac{1}{2}\alpha_v\beta_v + \frac{1}{2}\beta_v\gamma_v, \\ (e) & \gamma_{eff} = \gamma + \frac{1}{2}\gamma_v^2 - \frac{1}{2}\beta_v^2 \end{cases}$$

FIG. 30

$$K_{eff} = \begin{pmatrix} \alpha_{eff} & -\beta_{eff} \\ -\beta_{eff} & -\gamma_{eff} \end{pmatrix}$$

FIG. 31

$$\begin{cases} (a) & 320 \longrightarrow \alpha_{eff} - \gamma_{eff} < 0, \\ (b) & \alpha_{eff}\gamma_{eff} + \beta_{eff}^2 < 0, \end{cases}$$

FIG. 32

$$Z_4(\Gamma) = 2\pi^2(\alpha_v^2 + 2\beta_v^2 + \gamma_v^2 - 2\alpha_0 + 2\gamma_0) + \ldots$$

FIG. 33

$$\frac{1}{8\pi^4} Z_2(\Gamma) = -4\beta_0^2 + (\beta_v^2 + 2\gamma_0)(\beta_v^2 - 2\alpha_0) + 2\alpha_v^2\gamma_0$$
$$+ 4\beta_0\beta_v + \alpha_v^2\gamma_v^2 - 4\beta_0\beta_v\gamma_v - 2\alpha_0\gamma_v^2 + 2\alpha_v\gamma_v\beta_v^2.$$

FIG. 34

$$\begin{cases} (a) & Z_4 = 2\pi^2(2\beta_v^2 - 2\alpha_0 + 2\gamma_0) > 0 \\ (b) & Z_2 = 8\pi^4(\beta_v^2 + 2\gamma_0)(\beta_v^2 - 2\alpha_0) > 0. \end{cases}$$

FIG. 35

$$-4\beta_0^2 + (\beta_v^2 + 2\gamma_0)\beta_v^2 = 0.$$

FIG. 36

$$A_0 = \Sigma P_i A_i$$

PASSIVE LEVITATION IN ALTERNATING MAGNETIC FIELDS

This application claims the priority under 35 U.S.C. §119 (e)(1) of co-pending provisional application Ser. No. 60/612,606, filed Sep. 22, 2004 and incorporated herein by reference.

This invention was developed under Contract DE-AC04-94AL8500 between Sandia Corporation and the U.S. Department of Energy. The U.S. Government has certain rights in this invention.

FIELD OF THE INVENTION

The invention relates generally to levitating objects and, more particularly, to levitating objects in magnetic fields.

BACKGROUND OF THE INVENTION

Earnshaw's theorem states that it is impossible to have stable levitation in a magneto-static field. Although the theorem has a very broad scope, it requires some very precise conditions. In particular, the theorem fails if there are diamagnetic materials present, the levitating body is spinning, or the fields are alternating in time.

The discovery of the Levitron™ showed that it is possible to achieve stable levitation of a top in a steady magneto-static field. The Levitron™ is described in U.S. Pat. No. 5,404,062, incorporated herein by reference. Stable levitation has also been demonstrated using diamagnetic materials, one particular instance of which is levitation over a superconducting disc, which can be considered as a diamagnetic material with magnetic permeability of zero.

Previous work has shown that small particles can be levitated in an alternating magnetic field. This work has been outlined by W. Paul in *Electromagnetic Traps for Charged and Neutral Particles*, Rev. Modern Physics, 62 (1990), pp. 531-540 (hereinafter "Paul"), incorporated herein by reference. This has been applied beneficially in fields such as mass spectrometry, but the small particles are essentially point charges in the alternating electro-magnetic field, so rigid body dynamics of the levitated object can be neglected.

It is desirable in view of the foregoing to provide for levitating at a stable equilibrium, in an alternating magnetic filed, an object whose rigid body dynamics affect the levitation operation.

Some exemplary embodiments of the invention can achieve stable levitation of such an object by eliminating coupling between the rotational and translational forces acting on the object. Other exemplary embodiments of the invention can achieve stable levitation of such an object by varying the coupling between the rotational and translational forces acting on the object, while maintaining one or more of the rotational and translational forces steady in time.

BRIEF DESCRIPTION OF THE DRAWINGS

Various ones of the drawings are designated by the form, "Figure N(#)", where "N" is an integer, and "#" is a lower case alphabetic character. A textual reference herein to "Figure N" should be understood to direct attention generally to all "Figure N(#)" in the drawings.

FIGS. 1(a)-6(f) illustrate equations governing the linear stability of a top to be levitated in a magnetic system according to the invention.

FIGS. 7(a)-8(e) illustrate equations used to analyze the equations of FIGS. 1-6.

FIGS. 9(a) and 9(b) illustrate equations for stability according to exemplary embodiments of the invention.

FIG. 10 graphically illustrates results obtained by numerically integrating the equations of FIG. 9 to determine the monodromy matrix and Floquet exponents.

FIGS. 11(a)-13(b) illustrate mathematical expressions for stability according to exemplary embodiments of the invention.

FIG. 14 graphically illustrates results obtained by numerically integrating an equation of FIG. 12 to determine the monodromy matrix and Floquet exponents.

FIG. 15 illustrates a mathematical condition for stability according to exemplary embodiments of the invention.

FIGS. 27(a)-36 illustrate mathematical expressions associated with the translational/rotational coupling conditions of FIGS. 23-26.

DETAILED DESCRIPTION

Figures 13A, 13B, 14, 15:
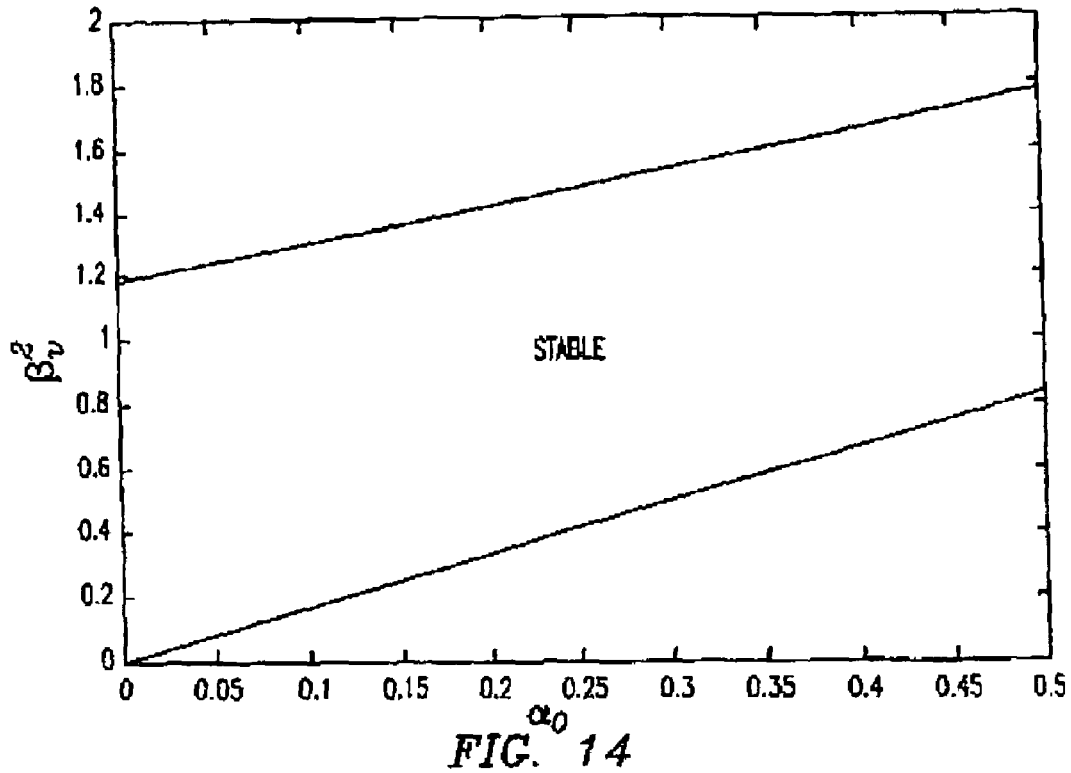
Figure 16:
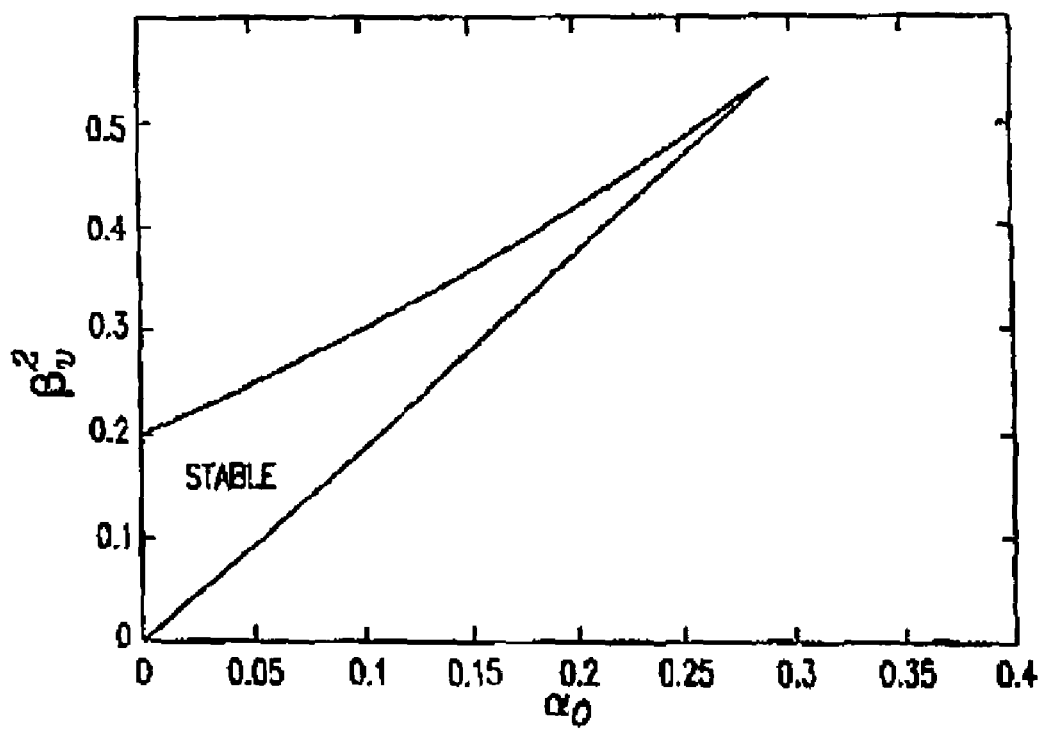
FIGS. 16-22 graphically illustrate results obtained by numerically integrating the equations of FIG. 11 to determine the monodromy matrix and Floquet exponents.
Figure 17:
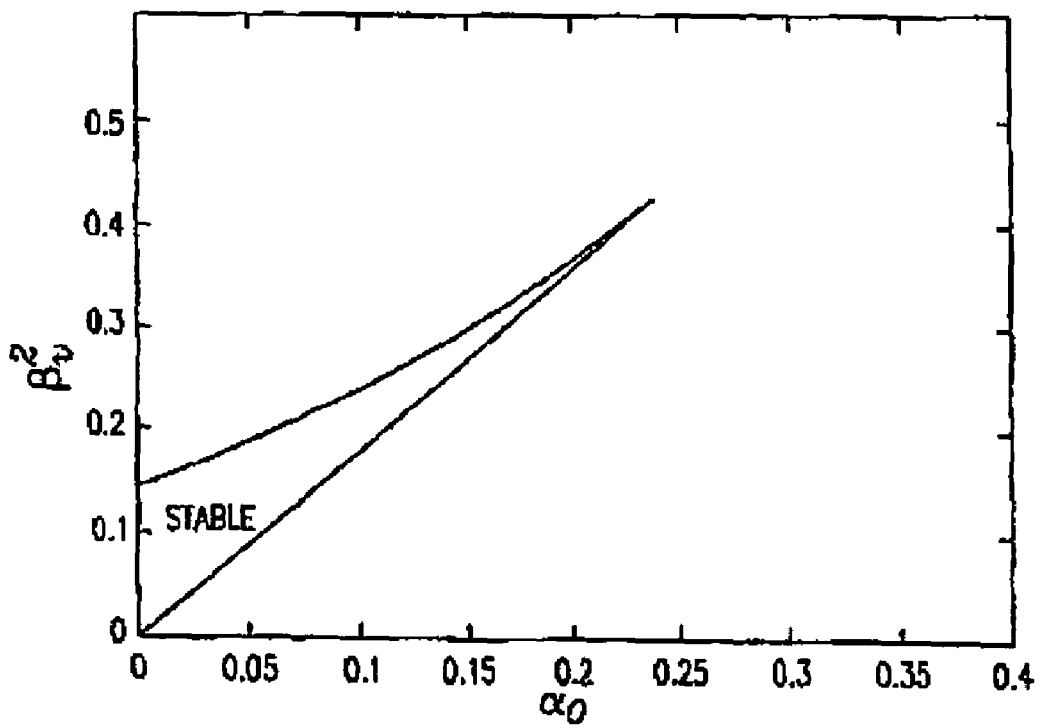
Figure 18:
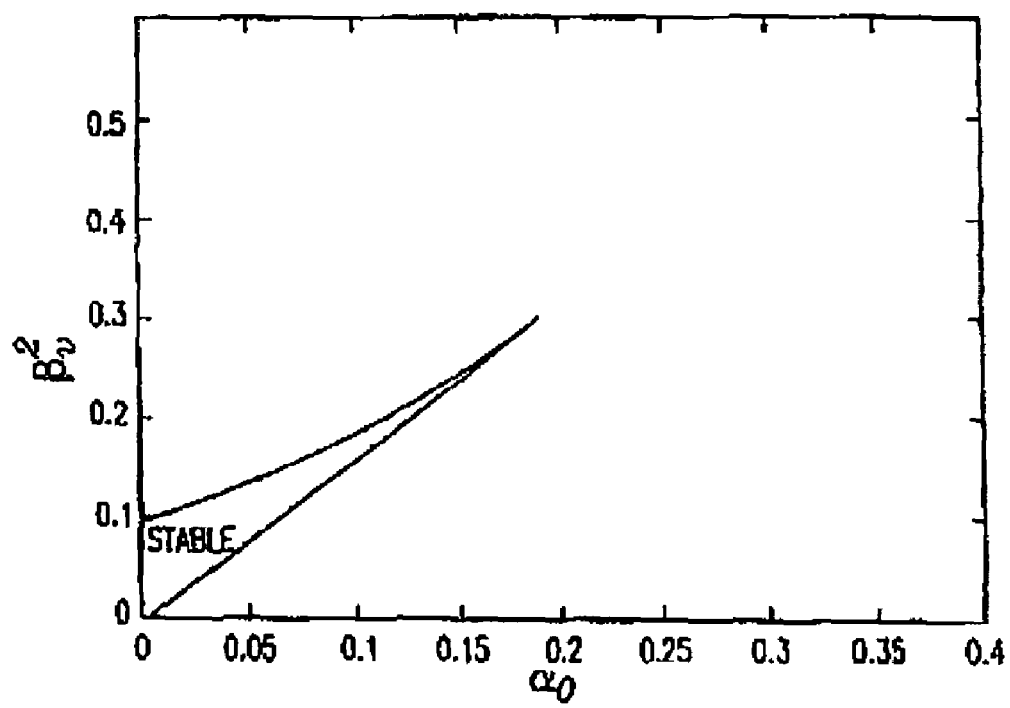
Figure 19:
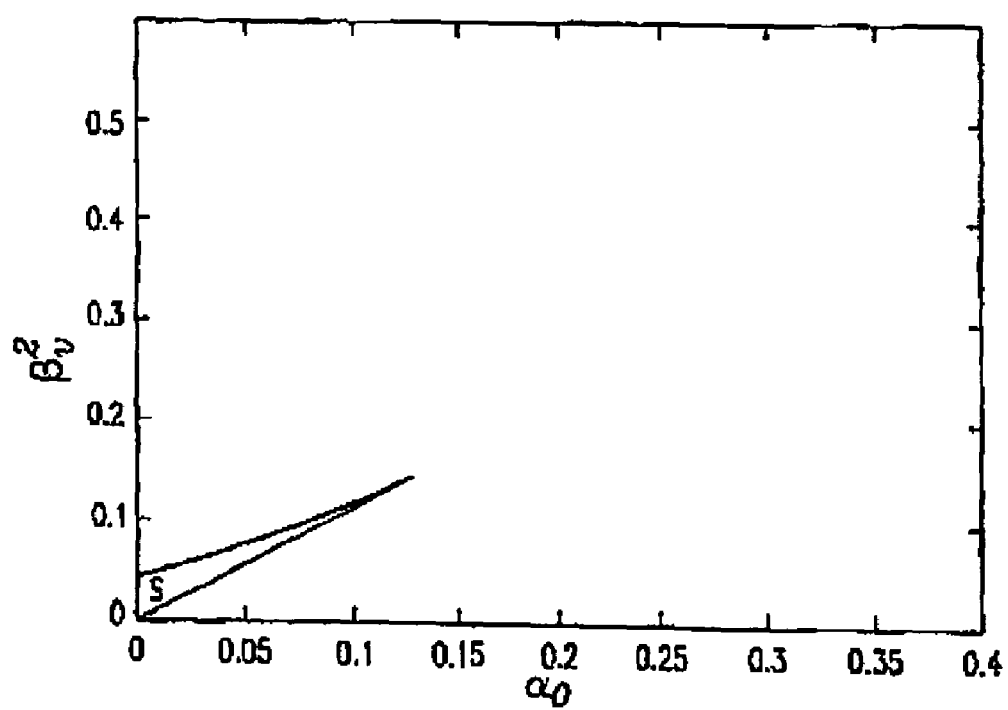

The present invention is concerned with achieving passive stable levitation in an alternating magnetic field environment. As described in detail hereinbelow, although the fields do vary over time, they vary slowly enough that the effects of the time varying terms in Maxwell's equations can be ignored. The levitation described hereinbelow is referred to as passive, because the system is passive in that the time variation of the magnetic field is predetermined, rather than being actively adjusted in response to the position of the levitated object.

The invention attempts to provide a system on a larger scale than the system outlined in Paul. In some embodiments, the invention essentially provides an oscillating field version of the Levitron™ that does not spin. To achieve the foregoing, the full (although linearized) rigid body dynamics of the levitated object need to be taken into account.

In some exemplary embodiments of the invention, a system of base magnets provides a steady magnetic field with axial symmetry about the z-axis (the direction of gravity). A system of axisymmetric magnetic coils produces an axisymmetric periodically varying magnetic field. The levitated object is an axisymmetric top with an axisymmetric system of magnetics attached to it. When the axis of the top is pointing in the z direction, and the center of mass of the top is at the origin, (1) the magnetic force from the steady field exactly balances the force of gravity, and (2) the time varying force vanishes. The result is a stable equilibrium position where the top is at rest in the time-varying field.

In some embodiments, the system can be described by a lateral translational spring constant A, an axial translational spring constant −2A, a rotational spring constant −C, and a term B that couples the translations to the rotations. Each of these has both a steady component, and a time-varying component. Due to Earnshaw's theorem, if the time varying fields are set to zero, it is not possible for the system to be stable with respect to both axial perturbations and lateral translation perturbations.

Some embodiments use a stabilizing mechanism that eliminates the coupling term B, and ensures that the rotational spring constant –C is positive. (This is equivalent to a stabilizing mechanism outlined in Paul.) This mechanism produces a rotationally stable top but, at any given instantly of time, the top sees a negative spring constant for either axial perturbations or lateral perturbations. However, overall stability in both the axial and lateral directions can be achieved, by varying the translational spring constant 2A(t) at a suitable amplitude and frequency.

Some embodiments use a stabilizing mechanism that maintains the translational spring constant A and the rotational spring constant –C steady in time, and periodically varies the coupling term B(t). To achieve stability, the field varies more rapidly than the natural frequency of the rotational oscillation of the top, and upper and lower limits are imposed on the strength of the time varying coupling term B(t).

As mentioned above, exemplary embodiments of the present invention achieve a stable equilibrium position with the center of mass of the top at the origin (x=y=z=0) and the axis of symmetry of the top pointing in the z direction. Even though the magnetic field is varying with time, a steady state equilibrium condition can be achieved if the time-varying components of force and torque acting on the top vanish at this equilibrium position. Due to symmetry, when the top is placed symmetrically in the field, all components of force and torque vanish except for the force in the z direction. The magnetic arrangement causes the time-varying component of the z-directed force to vanish, and the steady force in the z direction exactly balances the force of gravity.

The general linearized equations for an axisymmetric top can be written as shown in FIG. 1. These equations depend on the mass m and moment of inertia $I_1$ of the top, and the dynamical constants A, B, and C. These dynamical constants are defined in FIG. 2. In the expressions shown in FIG. 2, the partial derivatives are to be evaluated at the equilibrium position, for example, the position where the top has its axis of symmetry aligned with the axis of magnetic symmetry and its center of mass located on the axis of magnetic symmetry. The dynamical parameters A, B, and C are time-dependent due to the time-varying nature of the magnetic fields.

In some embodiments, the axis of symmetry of the top is oriented as follows. Assume that the axis initially points in the positive z direction. The top can be oriented by rotating it about the x-axis by $\theta$, then about the y-axis by $\phi$, and then about the z-axis by $\psi$. Because the linear stability of the system is the primary goal, and assuming that the top is axisymmetric (as in some embodiments), the angle $\psi$ does not appear in the equations of motion for the expository examples presented here.

For a steady field, if B=0 and A>0, this results in a stable harmonic oscillator for displacements in the z direction and (due to Earnshaw's theorem) an unstable oscillator for displacements in the x and y directions. Due to the coupling term B, a rotation of the top about the y-axis by $\phi$ will result in a force in the x direction proportional to $B\phi$, and a displacement of the top in the x direction will result in a torque about the y-axis proportional to Bx.

The form of the equations in FIGS. 1 and 2 holds for any axisymmetric system. Regardless of how complicated the systems of magnets in either base or the top may be, it is possible to find explicit expressions for A, B, and C. For example, for a simple system where the top carries a single dipole, quadrapole or octapole, and the base consists of a single coil or a single ring magnet, explicit expressions for A, B, and C can be determined. Using linear superposition, it is then possible to compute A, B, and C for arbitrarily complicated systems of magnets on the top and base. Alternatively, suitable data processing facilities can be used to compute the force and torque on the top when it is placed with an arbitrary position and orientation in an axisymmetric field, and A, B, and C can then be computed by numerically determining the derivatives of the forces and torques about the equilibrium position.

The functions A(t), B(t), and C(t) determine the stability properties of any given configuration of magnets on the top and base. However, in order to determine whether a configuration is in equilibrium, the lift L(t) must be determined. For a stable equilibrium condition, the lift L(t) must be independent of time, and must also be equal and opposite to the force of gravity acting on the top.

In a general example, each of A(t), B(t), and C(t) have both a steady component and a sinusoidally varying component, with all of the time-varying components having the same phase. This is illustrated by the equations of FIG. 3. The equations of FIG. 4 define dimensionless variables which, in conjunction with the equations of FIGS. 1 and 3, yield the equations of FIGS. 5 and 6. Note that the bottom equation in FIG. 5 decouples from the other two equations. The equations for $\chi$ and $\theta$ decouple from the equations shown in FIG. 5, and are almost identical to the equations for $\xi$ and $\phi$. If the equations for $\xi$ and $\phi$ are stable, then the equations for $\chi$ and $\theta$ will also be stable. Accordingly, the equations for $\chi$ and $\theta$ are not explicitly shown.

The equations of FIG. 5 can be separated into two independent systems. The equation for $\eta$ is a second order system that decouples from the other equations. The equations for $\xi$ and $\phi$ can be written as a fourth order equation as shown in FIG. 7 at 71. In FIG. 7, R(t) is a 4×4 matrix that satisfies R(t)=R(t+2π). In order to achieve stability, both equation 71 of FIG. 7 and the equation for $\eta$ in FIG. 5 must give stability. The equation for $\eta$ in FIG. 5 is Mathieu's equation, whose stability properties are well known. The stability analysis for equation 71 presented hereinbelow is a special case of an analysis give by J. Howard and R. MacKay in *Linear Stability of Symplectic Maps*, J. Math. Phys., 28 (1987), pp. 1036-1051, incorporated herein by reference.

Referring to FIG. 7, consider a fundamental matrix solution Q(t) that satisfies equations 72 and 73 of FIG. 7, ad define the monodromy matrix $\Gamma$ as in equation 74. The equilibrium condition shown at 75 will be stable if all of the eigenvalues of $\Gamma$ have magnitudes less than unity. However, a conservative system can at best have neutral stability. This follows since tr(R(t))=0. This implies that the Wronskian Wr(t), which is the determination of Q(t), is constant. This follows since the Wronskian satisfies equation 76. Because the Wronskian is independent of time, the determinant of Q(2π) must be equal to one. This implies that it is not possible for all of the eigenvalues of $\Gamma$ to have magnitudes less than unity. For this reason, the system can only have instability or neutral stability. For given values of the parameters of FIG. 6, it is straightforward to numerically integrate the system of equations and evaluate the eigenvalues of the monodromy matrix $\Gamma$.

It can be shown that the necessary and sufficient conditions for stability can be written as shown in FIG. 8. On the boundary between a region of stability and instability, one of the inequalities of FIG. 8 is replaced by an equality. For example, it is found numerically that Z1=0 is satisfied for the upper bound on $\beta v$ and Z2=0 is satisfied for the lower bound on $\beta v$, when $\alpha v=\gamma v=\beta 0=0$ and $\gamma 0>0$.

In some embodiments, both the steady and time-varying components of the coupling terms B(t) vanish. In this case, the equations for $\phi$, $\theta$, $\xi$, $\chi$, and $\eta$ all decouple from each other. The equations for $\phi$ and $\theta$ imply that the top is rotationally stable provided $\gamma 0 > 0$ and $\gamma v$ is not too large. Assuming that this is the case, the stability is determined by the condition that the equations of FIG. 9 both give stable solutions. Each of the equations of FIG. 9 is a particular case of Mathieu's equation. The theory of Mathieu's equation is well known. However, the parameters must be adjusted appropriately so that both equations of FIG. 9 give stable solutions at the same time. If the coefficients are frozen at any instant in time, only one of the equations is stable. However, because the fields are changing with time, overall stability can be achieved even though the equations with frozen coefficients give instability. The equations of FIG. 9 can be numerically integrated to determine the monodromy matrix and the Floquet exponents. FIG. 10 illustrates graphically an example of the region of stability for embodiments where the coupling term B(t) vanishes and there is no coupling between the rotational and translational modes. In particular, FIG. 10 plots the upper and lower bounds of
$\alpha v$ as a function of $\alpha 0$.

Further exemplary embodiments of the invention permit time variation only in the time-varying component $\beta v$ of the coupling term B(t). In some embodiments, the steady component $\beta 0$ of B(t) vanishes. Recalling that, in FIG. 5, the equation for $\eta$ is decoupled from the other equations, it is clear that the condition $\alpha 0 > 0$ must be satisfied in order for the top to be stable with respect to axial perturbations. Assuming that $\alpha 0 > 0$, the stability of the system is governed by the equations of FIG. 11.

If both $\beta v$ and $\alpha 0$ are small, it can be reasonably assumed that $\xi(t)$ changes slowly compared to the driving frequency, so $\xi(s)$ can be approximated as a constant in equation 110. This implies that equation 120 in FIG. 12 can be written. Equation 121 of FIG. 12 can then be written by substituting back into equation 111 of FIG. 11. Equation 121 can also be written as equation 122, which has the identical form of Mathieu's equation. As long as the system avoids regions of parametric resonance, it can be expected to be stable, provided the steady term in the spring constant is positive. This positive spring constant condition is illustrated by equation 130 of FIG. 13. As shown in equation 130, if $\beta v$ is large enough, the destabilizing effect of $\alpha 0$ can be overcome, but only if $\gamma 0 < 1$. However, as $\beta v$ increases, the oscillating term in equation 130 grows, and the system will eventually be driven into instability due to parametric excitation.

Equation 122 of FIG. 12 can be numerically integrated, and Floquet theory can be used to determine regions of stability and instability. FIG. 14 illustrates graphically an example of the neutral stability region for equation 122. In particular, FIG. 14 plots the upper and lower bounds of $\beta v$ for stable operation, with $\gamma 0 = 0.1$. As shown, the lower limit on stability is well approximated by equation 131 of FIG. 13. This lower limit on stability has also been found to agree well within the lower limit obtained by using Floquet theory directly on the set of equations in FIG. 11.

The condition $\gamma 0 < 0$ corresponds to the top being rotationally unstable in the absence of the coupling parameter $\beta v$. In this situation, if $\beta v$ and $\alpha 0$ are both small, the system will be unstable due to equation 110 of FIG. 11. It can be shown that the rotational instability can be avoided by satisfying the condition illustrated by the inequality of FIG. 15. FIG. 15 shows that, when $\gamma 0$ is negative, then even when $\alpha 0$ is infinitesimally small, there is a minimum value of $\beta v$ necessary in order to achieve stability.

Figure 20:
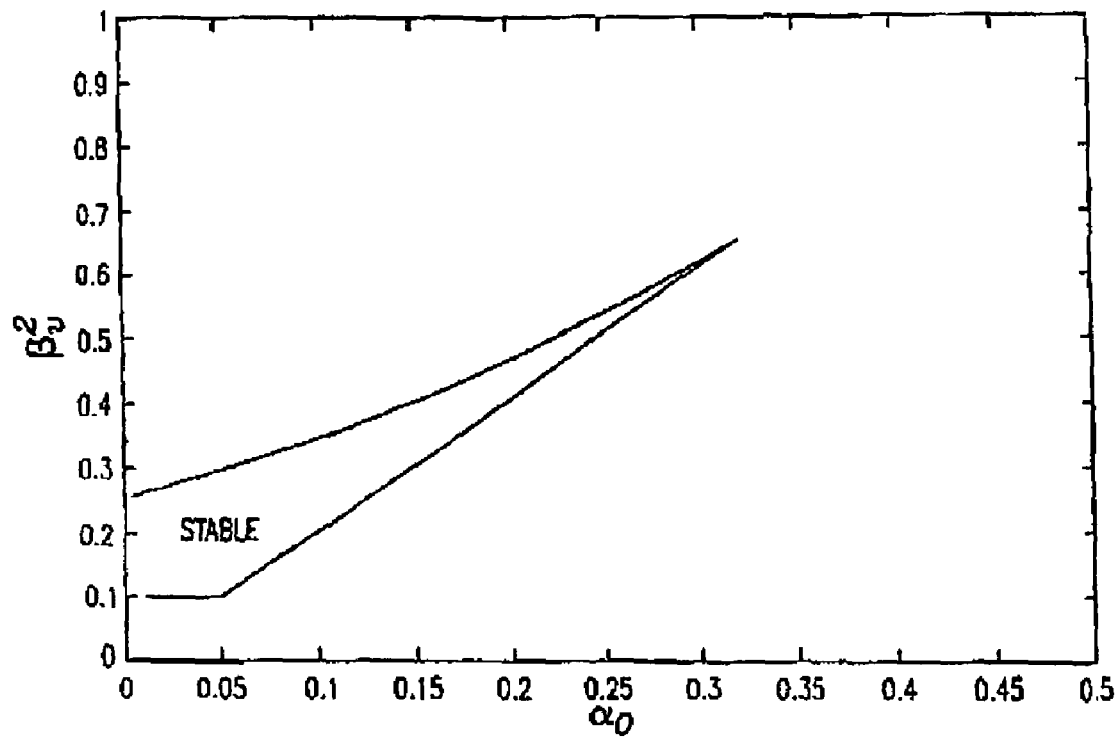
Figure 21:
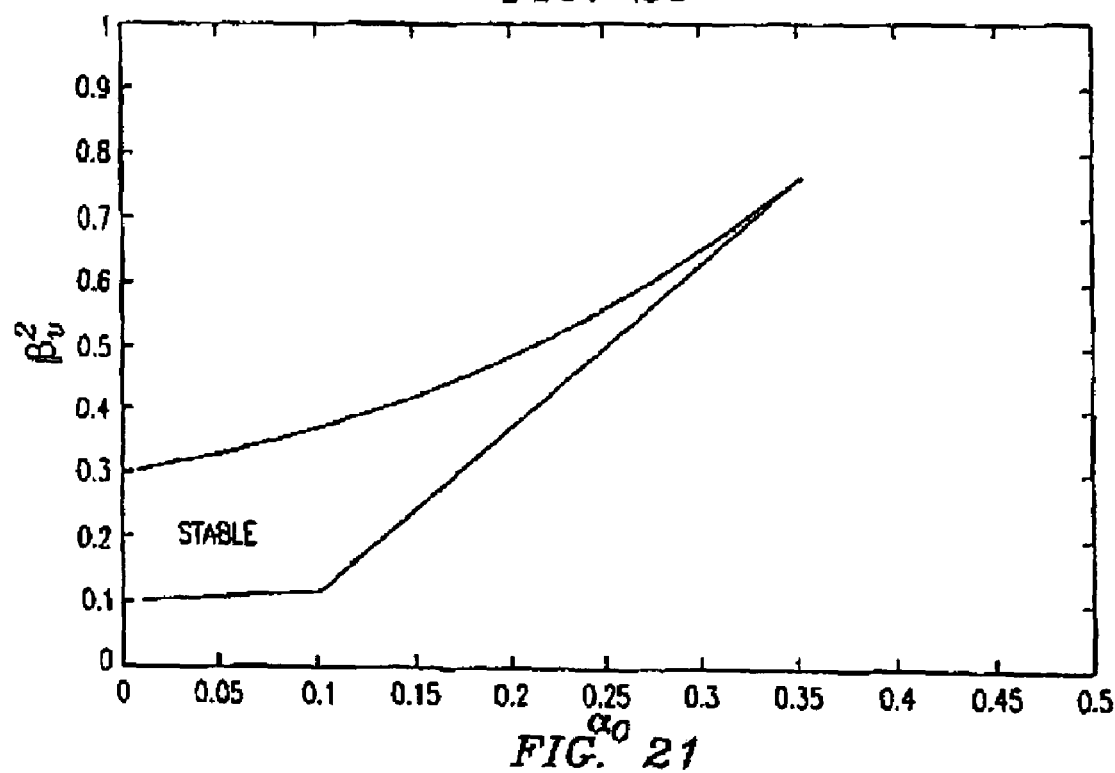
Figure 22:
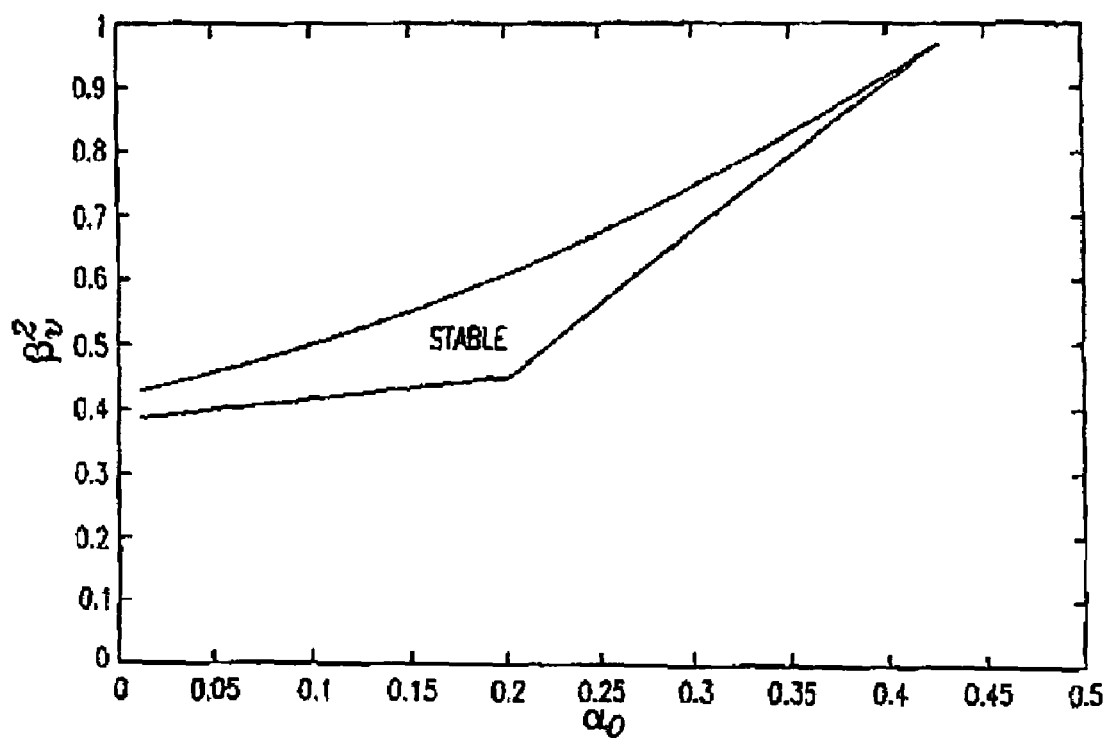
Figure 23:
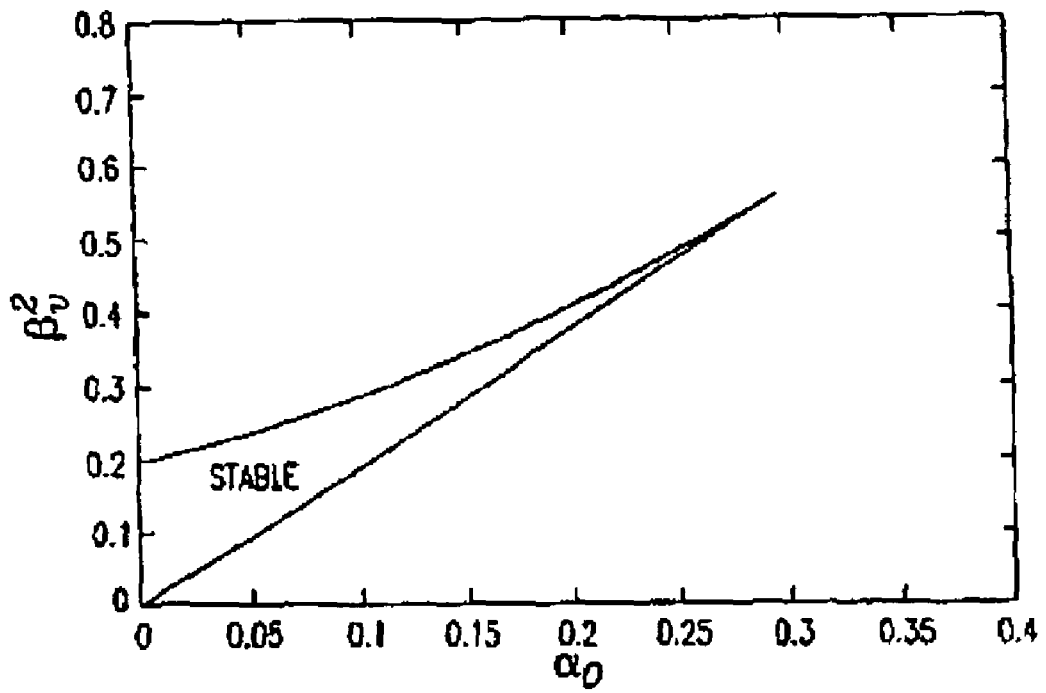
FIGS. 23-26 are similar to FIGS. 16-19, but with a difference in the translational/rotational coupling conditions.
Figure 24:
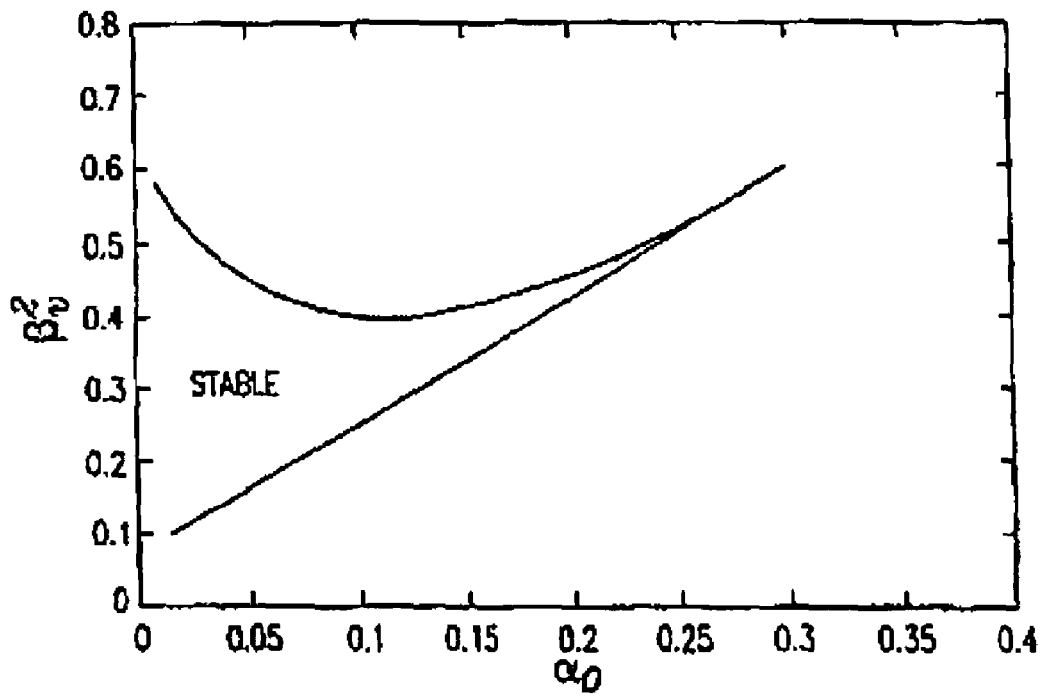
Figure 25:
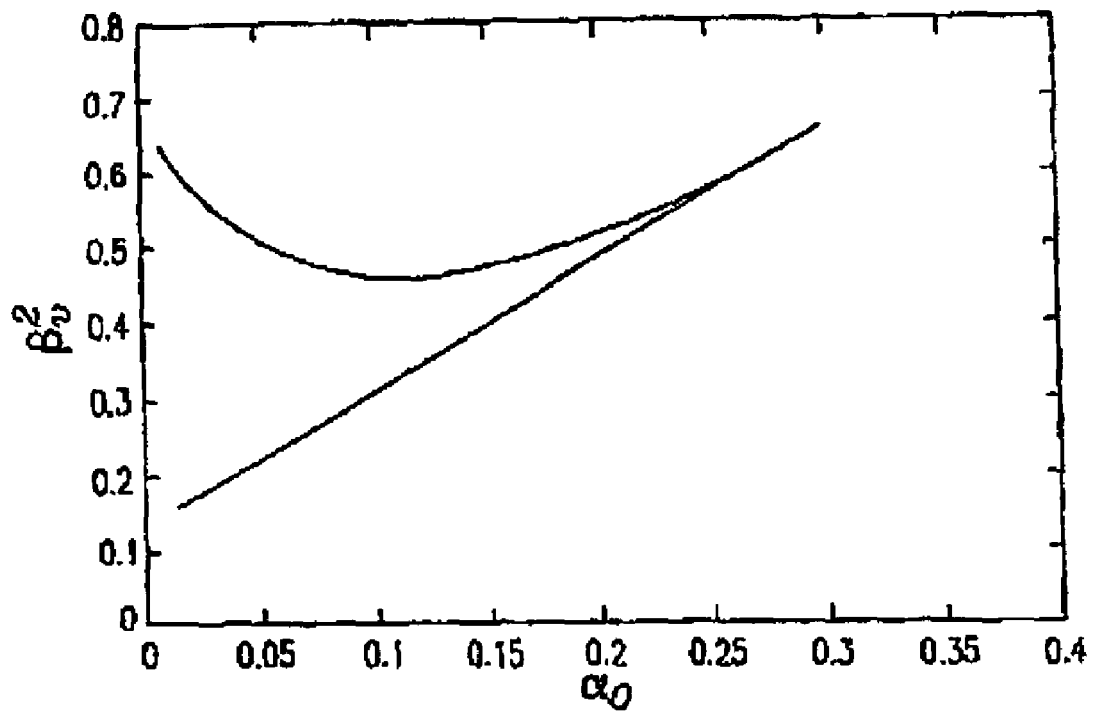
Figure 26:
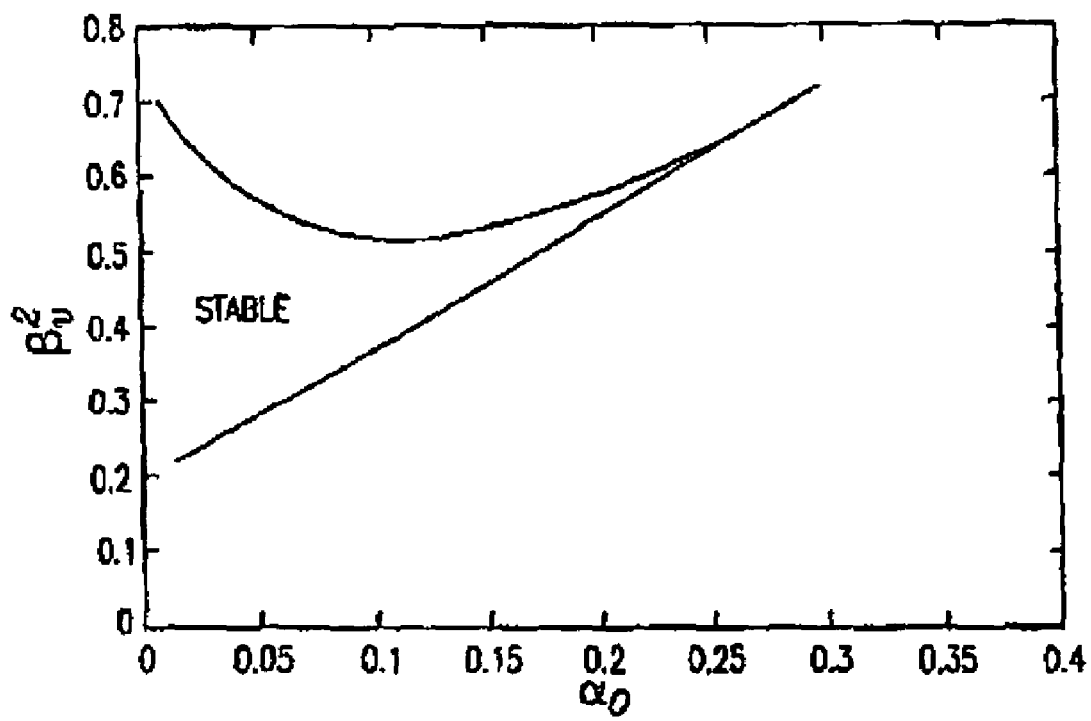

FIGS. 16-22 graphically illustrate the results of numerically integrating the full linearized stability equations of FIG. 11, and using Floquet theory to determine regions of stability and instability. These results show that the upper and lower limits on $\beta v$ converge toward each other at a finite value of $\alpha 0$. FIGS. 16, 17, 18, and 19 show the upper and lower limits on $\beta v$ as a function of $\alpha 0$ for $\gamma 0$ values of 0, 0.1, 0.2, and 0.4, respectively. As $\gamma 0$ increases, the region of stable operation shrinks until it completely vanishes just before $\gamma 0 = 1$. FIGS. 20, 21, and 22 show the upper and lower limits on $\beta v$ as a function of $\alpha 0$ for $\gamma 0$ values of $-0.05$, $-0.1$, and $-0.2$, respectively. In FIGS. 20-22, the curve for the lower limit on $\beta v$ exhibits an inflection point when $\alpha 0 + \gamma 0 = 0$. The portion of the curve where $\alpha 0 + \gamma 0 < 0$ is well approximated by the equation of FIG. 15, and the portion of the curve where $\alpha 0 + \gamma 0 > 0$ is well approximated by equation 130 of FIG. 13. As $\gamma 0$ decreases, the region of stability eventually shrinks to zero.

The numerical results presented in FIGS. 16-22 are determined by numerically integrating the linearized system of equations with different initial conditions in order to obtain the monodromy matrix. For given values of the various parameters, the Zk quantities of FIG. 8 can be computed. On a surface in parameter space where the system changes stability, the condition $Zk = 0$ must be satisfied for at least one of $k = 1, 2, 3, 4$. Beginning with a guess for a point in parameter space that satisfies the condition $Zk = 0$, the secant method can be used to change one parameter until a point that exactly satisfies the condition is identified. This permits the regions of stability to be mapped.

FIGS. 23, 24, 25, and 26 graphically illustrate upper and lower bounds on $\beta v$ as a function of $\alpha 0$ for $\beta 0$ values of 0, 0.005, 0.002, and 0.01, respectively, and for $\gamma 0 = 0$. It can be seen that the lower limit on $\beta v$ is raised as $\beta 0$ increases, and that, for $\alpha 0 = 0$, the amount it is raised is nearly proportional to $\sqrt{\beta 0}$. In general, the region of neutral stability moves upward as $\beta 0$ increases.

In order to understand the dependence of the stability region on $\beta 0$, assume that the six dimensionless parameters of FIG. 6 are small, and that the three steady parameters are small compared to the time-varying parameters. The solution equations are shown in FIG. 27, where $\xi 0$ and $\phi 0$ vary relatively slowly, and $\xi 1$ and $\phi 1$ vary relatively rapidly. Under these assumptions, the first two equations in FIG. 5 imply that the fast components satisfy the equations of FIG. 28. These equations can be solved to get the equations of FIG. 29. Substituting the expressions of FIG. 29 into the first two equations of FIG. 5, and taking the time average (ignoring the time variations of $\xi 0$ and $\phi 0$), the averaged equations shown in FIG. 30 are obtained. A necessary and sufficient condition for these averaged equations to have neutrally stable solutions is that the eigenvalues of the matrix shown in FIG. 31 are all negative. The inequalities of FIG. 32 define a necessary and sufficient condition for all of the eigenvalues of FIG. 31 to be negative.

The necessary and sufficient conditions described above with respect to FIGS. 27-32 can also be obtained by carrying out a regular perturbation expansion to find the quantities Zk of FIG. 8, assuming that all of the dynamical parameters are small. This process reveals that all of the quantities Zk are guaranteed to be positive, except for Z2 and Z4. The condition 321 of FIG. 32 is related to the condition $Z3 > 0$. In particular, Z4 can be expressed as shown in FIG. 33. The condition 322 of FIG. 32 is related to the condition $Z2 > 0$. In particular, Z2 can be expressed as shown in FIG. 34. If $\alpha v = \gamma v = \beta 0 = 0$, the asymptotic stability conditions imply the relationships 351 and 352 shown in FIG. 35.

In order for the condition 352 of FIG. 35 to be satisfied, the condition 353 must be satisfied. If so, and if γ0>0, then condition 351 will also be satisfied. This can be shown to produce the curves for the lower bound on βv shown in FIGS. 17-19 (where γ0>0). If γ0<0, then satisfaction of condition 352 does not necessarily imply satisfaction of condition 351. This produces the inflection points in the curves of FIGS. 20-22.

Figure 37:
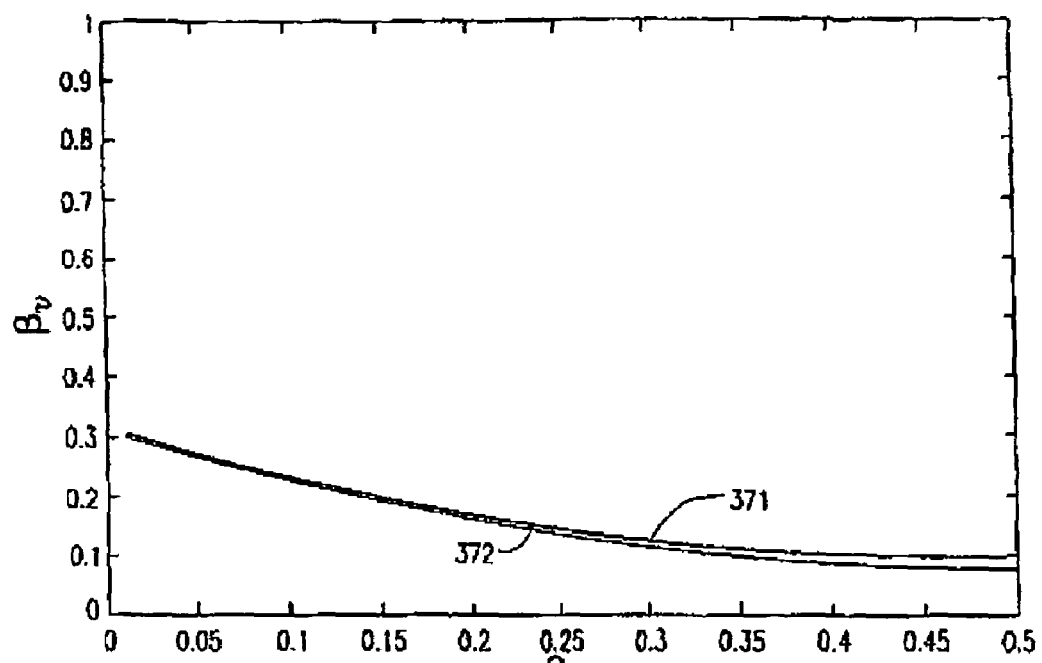
FIGS. 37 and 38 graphically illustrate respective pairs of translational/rotational coupling parameter curves according to the invention.
Figure 38:
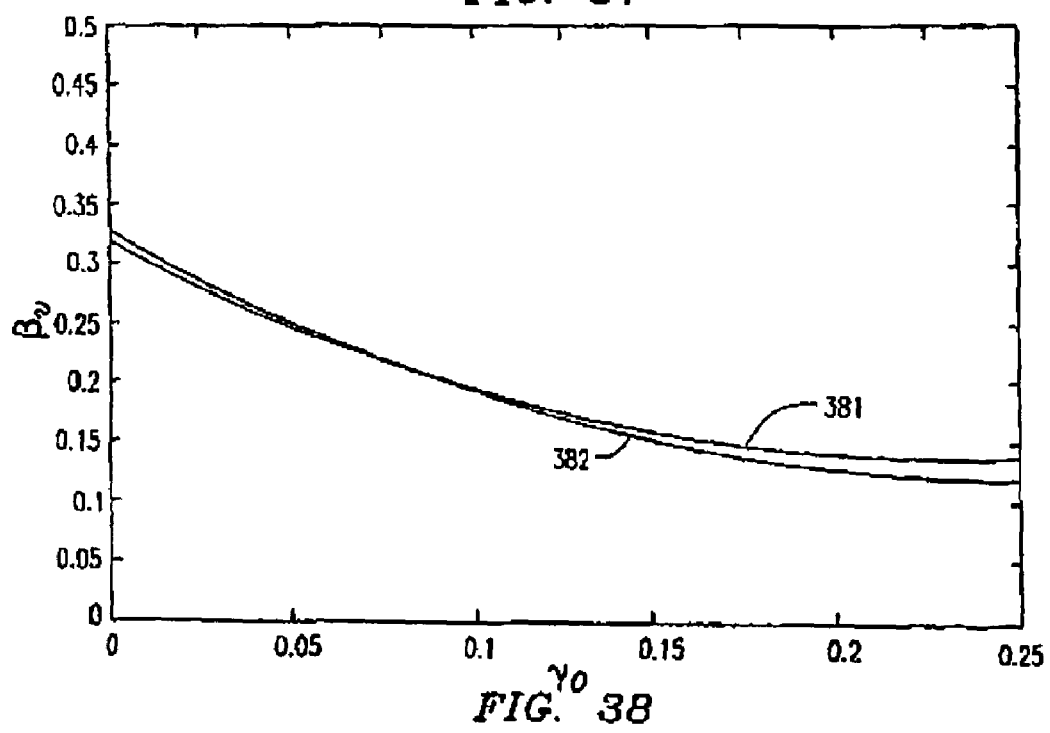

If αv=γv=α0=0, but β0 is non-zero, then the condition Z2=0 can be written as shown in FIG. 36. If γ0 is small, then the equation of FIG. 36 shows that the lower bound on βv is proportional to the square root of β0, which was also observed from the numerical results of FIGS. 16-19. In general, FIG. 36 gives a quadratic expression for βv. FIG. 37 graphically illustrates βv as a function of β0 for γ0=0.1. In particular, FIG. 37 shows both the results 371 obtained by numerically solving the full set of linearized differential equations to compute the monodromy matrix, and the result 372 obtained by solving the equation of FIG. 36. FIG. 38 is generally similar to FIG. 37, but shows βv as a function of γ0 for β0=0.05. The curve 381 shows the result obtained by numerically solving the full set of linearized differential equations to compute the monodromy matrix, and the curve 382 shows the result of solving the equation of FIG. 36.

Figures 39, 40:
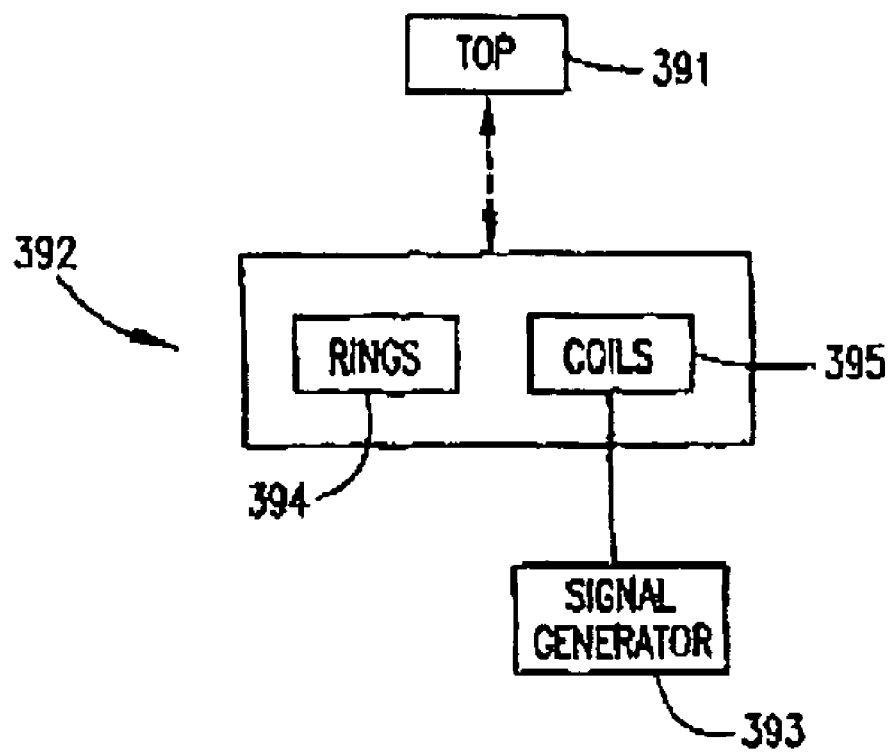
FIG. 39 diagrammatically illustrates exemplary embodiments of a magnetic levitation apparatus according to the invention.
FIG. 40 illustrates a linear equation that can be used to design the magnetic levitation apparatus of FIG. 39 according to exemplary embodiments of the invention.

Exemplary embodiments of the invention provide a magnetic levitation system such as shown in FIG. 39. The system of FIG. 39 includes a top 391 that carries a plurality of systems of axisymmetric multipoles (not explicitly shown). These multipoles are generally displaced from the center of mass of the top. Each of these systems of magnets on the top can be generally approximated as a linear combination of dipoles, quadrapoles, and octapoles. For example, a ring magnet of finite thickness can be approximated as a dipole plus an axisymmetric octapole.

The steady fields are produced in FIG. 39 by one or more axisymmetric rings of axially magnetized material provided in a base magnet system 392. These rings, illustrated diagrammatically at 394, can be modeled as either infinitesimally thin with a prescribed magnetization per unit length P0, or as having a finite thickness with a prescribed magnetization per unit volume. If the infinitesimally thin model is used, then a magnetization per unit volume, M0, and a cross sectional area, S, can be prescribed for the ring such that S×M0=P0.

The alternating fields are produced in FIG. 39 by one or more loops of wires (coils) in the magnet base system 392. These coils, illustrated diagrammatically at 395, carry currents (e.g., sinusoidally oscillating currents) produced by a suitable signal generator 393. For any given configuration of magnets on the top and the base in the system, the computation of A, B, and C (see FIG. 3) is straightforward, as is the computation of the lift L. In particular, A, B, C, and L can be computed from knowledge of the first few terms of the magnetic potential about the equilibrium position of any magnet on the top. In order to find the multidimensional Taylor series, it is only necessary to have the Taylor series on the axis of symmetry. This is true because, for an axisymmetric field, the Taylor series on the axis is sufficient to generate all of the terms in the spherical harmonic expansion of the field. For axisymmetric rings and coils, the Taylor series of the magnetic potential on the axis of symmetry is easily computed.

If, after computing A, B, C, and L, it is determined that the either the time-varying component of L is not zero, or the steady component of L does not balance the force of gravity, then the configuration is not stable, and will not levitate the top in a stable equilibrium condition. On the other hand, if the time-varying component of L is zero and the steady component of L balances the force of gravity, then all of the dimensionless parameters of FIG. 6 can be computed, and Floquet theory can be used to determine if the configuration is, in fact, stable.

In one example, the process of finding configurations of magnets that give stable equilibrium assumes that the magnetic system includes four magnetic rings positioned at predetermined locations in the base, in combinations with an arbitrarily specified arrangement of magnets on the top. For the given mass and movements of inertia of the top, values of A0, B0, C0, Bv (see FIGS. 3 and 6), and L that will produce a stable equilibrium with the center of mass at the origin can be determined. (In this example, Av and Cv are set to zero, as described above.) Magnetizations per unit length, Pi, that produce the desired values can be determined by noting that, for example, if Ai represents the contribution of the ith ring to A0 when the ith ring has unit magnetization per unit length, then the total value of A0 is given by FIG. 40. Similar expressions hold for B0, C0, and L0. If the base includes for magnetic rings (i=1, 2, 3, 4) and if each Ai value is arbitrarily assumed to be, for example, (¼)×A0 (with each Bi, Ci, and Li value sized in the same manner relative to B0, C0, and L0, respectively), then there are four linear equations in four unknowns, which can be solved for the values of Pi. For a known value of M0, a cross-sectional area Si can be appropriately selected for the ith ring in order to give the desired value of Pi for that ring.

A similar procedure can be carried out for the time-varying parameters. If the current in the coils is known, and there are at least four coils, then a system of coils can be designed to produce any specified values of the time-varying parameters.

A detailed example of a specific design configuration according to the invention is set forth in the Appendix.

Although exemplary embodiments of the invention have been described above in detail, this does not limit the scope of the invention, which can be practiced in a variety of embodiments.

APPENDIX

A. Passive Alternating Levitron

1 Basics

We assume that the magnetic material has a density of 7360 kg/m$^3$, and a magnetization per unit volume of $M_0$=1.1e6 Amp/M.

The vertical reference point is the CG of the rotor. All distances are specified in centimeters.

2 The Rotor

The rotor has two dipoles on it. The dipoles are assumed to be cylinders with a thickness of $\sqrt{3}$ times their radius. This aspect ratio is chosen so that they have no octopole moments. It should be noted that they also do not have a quadrapole moment (no cylinder does). The magnets are sized so that the center of mass of the magnets is at the center of mass of the rotor. This means that any additional weight on the rotor should be distributed so that the center of mass of the added weight is at the center of mass of the rotor.

The total mass of the rotor is mass=8.24×10$^{-2}$ gm

The mass of the magnets is 0.0646 gm, so we must add an additional 0.0179 gm to the rotor. This added mass includes the mass of the supporting bar.

We will get additional robustness if the non-magnetic mass is added as far away from the center of mass as possible.

|  | Radius | Height | z position | Mass | Dipole Strength | Polarity |
|---|---|---|---|---|---|---|
| $Dip_1$ | .1 cm | .173 cm | .55 cm | 4.e−2 gm | 59.78 d-4 Amp − $m^2$ | neg |
| $Dip_2$ | .085 cm | .147 cm | −.9 cm | 2.46e−2 gm | 36.7 d-4 Amp − $m^2$ | neg |

3 The Coil

There is a single coil with a square cross section.

| Center Radius | Center Vertical Position | Thickness | Current | Frequency |
|---|---|---|---|---|
| 1.0 cm | .5 cm | .45 cm | 100 Amps | 36 Hz |

4 The Base

The base consists of two rings.

|  | Center Radius | Center z pos | thickness | Polarity |
|---|---|---|---|---|
| $Ring_1$ | 3.3 cm | −1. cm | .1 cm | neg |
| $Ring_2$ | 1.6 cm | 1.1 cm | .055 cm | pos |

What is claimed is:

1. A method of levitating an object including an axisymmetric magnet arrangement, comprising:
   positioning the object in an alternating axisymmetric magnetic field environment in order to subject the object to rotational and translational magnetic forces; and
   while the object is positioned in the alternating axisymmetric magnetic field environment, controlling the alternating axisymmetric magnetic field environment to maintain one of the rotational and translational magnetic forces steady in time, to produce a coupling between the rotational and translational magnetic forces, and to vary said coupling in a predetermined manner.

2. The method of claim 1, wherein said controlling step includes controlling the alternating axisymmetric magnetic field environment to vary said coupling continuously.

3. The method of claim 2, wherein said coupling includes a component that is steady in time and a component that varies in time.

4. The method of claim 1, wherein said controlling step includes controlling the alternating axisymmetric magnetic field environment to vary said coupling periodically.

5. The method of claim 4, wherein said coupling includes a component that is steady in time and a component that varies in time.

6. The method of claim 4, wherein said controlling step includes controlling the alternating axisymmetric magnetic field environment to vary said coupling continuously.

7. The method of claim 1, wherein said coupling includes a component that is steady in time and a component that varies in time.

8. The method of claim 1, wherein said controlling step includes controlling the alternating axisymmetric magnetic field environment to maintain all of the rotational and translational magnetic forces steady in time.

9. An apparatus for levitating an object including an axisymmetric magnet arrangement, comprising:
   a system of axisymmetric coils and axisymmetric magnetic rings; and
   a signal generator connected to said axisymmetric coils and cooperable with said system of axisymmetric coils and axisymmetric magnetic rings for producing an alternating axisymmetric magnetic field environment which, when the object is positioned therein, subjects the object to rotational and translational magnetic forces, said signal generator cooperable with said system of axisymmetric coils and axisymmetric magnetic rings while the object is positioned in the alternating axisymmetric magnetic field environment for controlling the alternating axisymmetric magnetic field environment to maintain one of the rotational and translational magnetic forces steady in time, to produce a coupling between the rotational and translational magnetic forces, and to vary said coupling in a predetermined manner.

10. The apparatus of claim 9, wherein said signal generator is cooperable with said system of axisymmetric coils and axisymmetric magnetic rings for controlling the alternating axisymmetric magnetic field environment to vary said coupling continuously.

11. The apparatus of claim 10, wherein said coupling includes a component that is steady in time and a component that varies in time.

12. The apparatus of claim 9, wherein said signal generator is cooperable with said system of axisymmetric coils and axisymmetric magnetic rings for controlling the alternating axisymmetric magnetic field environment to vary said coupling periodically.

13. The apparatus of claim 12, wherein said coupling includes a component that is steady in time and a component that varies in time.

14. The apparatus of claim 12, wherein said signal generator is cooperable with said system of axisymmetric coils and axisymmetric magnetic rings for controlling the alternating axisymmetric magnetic field environment to vary said coupling continuously.

15. The apparatus of claim 9, wherein said coupling includes a component that is steady in time and a component that varies in time.

16. The apparatus of claim 9, wherein said signal generator is cooperable with said system of axisymmetric coils and axisymmetric magnetic rings for controlling the alternating axisymmetric magnetic field environment to maintain all of the rotational and translational magnetic forces steady in time.

* * * * *